US012114803B2

(12) United States Patent
Thompson

(10) Patent No.: US 12,114,803 B2
(45) Date of Patent: Oct. 15, 2024

(54) TRANSPARENT OBJECT DETECTION

(71) Applicant: LAVAZZA PROFESSIONAL NORTH AMERICA LLC, West Chester, PA (US)

(72) Inventor: Mark Thompson, Aldershot (GB)

(73) Assignee: Lavazza Professional North America, LLC, West Chester, PA (US)

( * ) Notice: Subject to any disclaimer, the term of this patent is extended or adjusted under 35 U.S.C. 154(b) by 0 days.

(21) Appl. No.: 16/789,907

(22) Filed: Feb. 13, 2020

(65) Prior Publication Data

US 2020/0260906 A1 Aug. 20, 2020

Related U.S. Application Data

(60) Provisional application No. 62/805,590, filed on Feb. 14, 2019.

(51) Int. Cl.
*A47J 31/52* (2006.01)
*A47J 31/46* (2006.01)
(Continued)

(52) U.S. Cl.
CPC ............ *A47J 31/525* (2018.08); *A47J 31/46* (2013.01); *G01V 8/20* (2013.01); *G05B 19/042* (2013.01); *G05B 2219/25257* (2013.01)

(58) Field of Classification Search
CPC .......... A47J 31/401; A47J 31/44; A47J 31/46; A47J 31/525; B07C 5/3404; B65B 1/48;
(Continued)

(56) References Cited

U.S. PATENT DOCUMENTS 4,182,451 A 1/1980 Watson
4,458,735 A 7/1984 Houman
(Continued)

FOREIGN PATENT DOCUMENTS

CN 1388890 A 1/2003
CN 102519145 A 6/2012
(Continued)

OTHER PUBLICATIONS

International Search Report for Related International Application No. PCT/US2020/018075 mailed Jun. 23, 2020.
(Continued)

*Primary Examiner* — Timothy L Maust
*Assistant Examiner* — Christopher M Afful
(74) *Attorney, Agent, or Firm* — The Belles Group, P.C.

(57) ABSTRACT

According to one embodiment, a beverage preparation machine includes a beverage dispenser, a cup holding region located below the beverage dispenser, a light source configured to transmit light across a portion of the cup holding region, and a receiver configured to receive at least a portion the light transmitted by the light source. A processor determines whether a transparent cup has been sufficiently inserted into the cup holding region or is at a desired height by detecting either a trough in a light level of the portion of the light received at the receiver, or an inverted trough in a light level of the light transmitted by the light source. Upon making the determination that the transparent cup is not sufficiently inserted or at the desired height, the processor prevents the beverage dispenser from dispensing a beverage.

13 Claims, 5 Drawing Sheets

(51) Int. Cl.
*G01V 8/20* (2006.01)
*G05B 19/042* (2006.01)

(58) Field of Classification Search
CPC ............. B67C 3/28; B67C 3/284; B67D 1/08;
B67D 1/12; B67D 5/08; B67D 1/00;
B67D 1/0871; B67D 1/0888; B67D
1/1236; B67D 1/1238; B67D 1/124;
B67D 1/1247; B67D 1/16; B67D
2001/1263; G01B 11/02; G01F 23/292;
G01F 23/2885; G01F 23/2921; G01F
23/2927; G05D 7/06; G06F 17/00; G07F
13/065; G01V 8/20; G05B 19/042; G05B
2219/25257
USPC .......................................................... 141/94
See application file for complete search history.

(56) References Cited

U.S. PATENT DOCUMENTS

| | | | |
|---|---|---|---|
| 6,323,954 B1 * | 11/2001 | Halter | ...................... B65H 7/08 356/624 |
| 6,761,284 B2 | 7/2004 | Knepler | |
| 7,912,579 B2 | 3/2011 | Stettes | |
| 2001/0050116 A1 | 12/2001 | Skell | |
| 2010/0159097 A1 | 6/2010 | Boussemart et al. | |
| 2010/0294797 A1 * | 11/2010 | Hirschbain | ........... A47J 31/401 219/494 |
| 2016/0280527 A1 * | 9/2016 | Griscik | ................ B67D 1/0872 |
| 2020/0307983 A1 * | 10/2020 | Checchinato | ............ B67D 1/12 |

FOREIGN PATENT DOCUMENTS

| | | |
|---|---|---|
| CN | 103549882 A | 2/2014 |
| CN | 107969918 A | 5/2018 |
| EP | 1811881 B1 | 3/2012 |
| EP | 3275348 A1 | 1/2018 |
| JP | 2001-034833 A | 2/2001 |
| JP | 2003-067828 A | 3/2003 |
| JP | 2007-128379 A | 5/2007 |
| KR | 2010-0061110 A | 6/2010 |
| WO | WO 2016-177417 A1 | 11/2016 |
| WO | WO 2017-149049 A1 | 9/2017 |
| WO | WO 2019-057506 A1 | 3/2019 |
| WO | WO 2020/035735 A2 | 2/2020 |

OTHER PUBLICATIONS

Chinese Search Report for related application dated Aug. 23, 2022.

* cited by examiner

TRANSPARENT OBJECT DETECTION

CROSS REFERENCE TO RELATED APPLICATIONS

The present application claims the benefit of U.S. Provisional Patent Application No. 62/805,590, filed on Feb. 14, 2019, which is incorporated herein by reference.

BACKGROUND

For high-pressure coffee makers and related beverage preparation machines, it is important to ensure that the user's cup has been sufficiently inserted into the machine holding area and is at the correct distance from the beverage dispenser. Certain challenges arise, however, when the user's cup is made of a transparent material such as glass. There is need of a system for accurately detecting the presence and/or height of a transparent cup in a beverage preparation machine. There is also need for detecting positioning of other transparent objects.

BRIEF SUMMARY

The present disclosure may be directed, in one aspect, to a beverage preparation machine including a beverage dispenser; a cup holding region located below the beverage dispenser; a light source configured to transmit light across a portion of the cup holding region; a receiver configured to receive at least a portion the light transmitted by the light source; and a processor operably coupled to the receiver and the beverage dispenser, the processor configured to determine whether a transparent cup has been sufficiently inserted into the cup holding region or is at a desired height by detecting a trough in a light level of the portion of the light received at the receiver; or an inverted trough in a light level of the light transmitted by the light source; wherein the processor is further configured to, upon making the determination that the transparent cup is not sufficiently inserted or at the desired height, prevent the beverage dispenser from dispensing a beverage.

In another aspect, a method includes transmitting, by a light source, light across a portion of a cup holding region of a beverage preparation machine, the beverage preparation machine comprising a beverage dispenser, the cup holding region located below the beverage dispenser, the light source, a receive, and a processor; receiving, by the receiver, at least a portion the light transmitted by the light source; determining, by the processor, whether a transparent cup has been sufficiently inserted into the cup holding region or is at a desired height by detecting a trough in a light level of the portion of the light received at the receiver; or an inverted trough in a light level of the light transmitted by the light source; and upon making the determination that the transparent cup is not sufficiently inserted or at the desired height, preventing, by the processor, the beverage dispenser from dispensing a beverage.

In another aspect, an apparatus includes a holding region for an object having a transparent portion; a light source configured to transmit light across a portion of the holding region; a receiver configured to receive at least a portion the light transmitted by the light source; and a processor operably coupled to the receiver, the processor configured to determine whether the object has been sufficiently inserted into the holding region or is at a desired height by detecting a trough in a light level of the portion of the light received at the receiver; or an inverted trough in a light level of the light transmitted by the light source; wherein the processor is further configured to, upon making the determination that the object is not sufficiently inserted or at the desired height, prevent a process from being carried out.

In another aspect, a method includes transmitting, by a light source, light across a portion of a holding region of an apparatus, the apparatus comprising the light source, a receiver; and a processor; receiving, by the receiver, at least a portion the light transmitted by the light source; determining, by the processor, whether an object having a transparent portion has been sufficiently inserted into the holding region or is at a desired height by detecting a trough in a light level of the portion of the light received at the receiver; or an inverted trough in a light level of the light transmitted by the light source; and upon making the determination that the object is not sufficiently inserted or at the desired height, preventing, by the processor, a process from being carried out.

BRIEF DESCRIPTION OF THE DRAWINGS

The present disclosure will become more fully understood from the detailed description and the accompanying drawings, wherein.

DETAILED DESCRIPTION

Figure 1A:
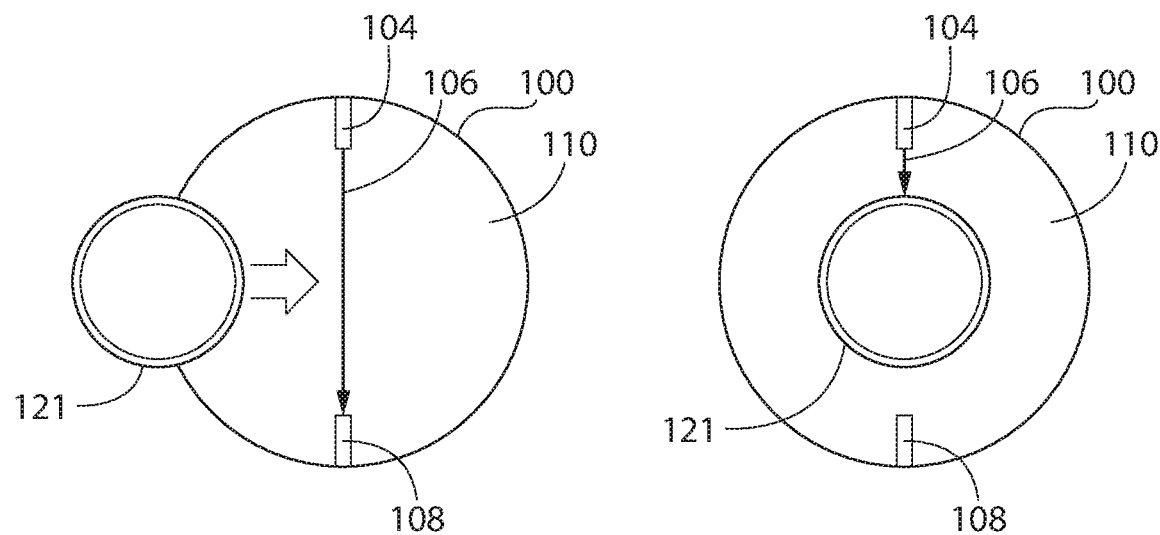
FIG. 1A is an overhead view of an opaque cup entering a cup holding region of a beverage preparation machine according to a first embodiment where a break-beam approach determines the insertion of the cup.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Referring now to the figures, FIG. 1A is an overhead view of an opaque cup 121 entering a cup holding region 110 of a beverage preparation machine 100 according to a first embodiment where a "break-beam" approach determines the insertion of the cup. In the exemplified embodiment, the beverage preparation machine 200 uses high pressure to brew coffee and prepare other drinks. To ensure the drink is successfully transferred to the cup 121 without danger or unwanted mess, it is valuable to ensure that the cup is both sufficiently inserted into the cup holding region 210 and at a proper height to not be too distant from the beverage dispenser 202. It is noted that in other embodiments the dispenser need not be a high-pressure dispenser.

The beverage preparation machine includes a light source 104 transmitting light 106 to a light receiver 108. As can be seen, when the opaque cup 121 is yet to enter the cup holding region 110, the light 106 is able to be transmitted to the receiver 108. But when the opaque cup 121 is sufficiently inserted into the cup holding region 110, the light 106 is no longer capable of being transmitted to the receiver 108. When the light is not received by the receiver 108, a processor (see FIG. 2) operably coupled to the receiver 108 can determine that the cup 121 is sufficiently inserted, thus enabling the beverage preparation to begin and ensuring the beverage is dispensed into the cup. In other embodiments, more than one beam and/or receiver can be used. For example, two beams could be used to ensure that the cup is inserted to intercept two different beams and different depths, thus ensuring a more precise positioning of the cup. Further, multiple beams at different height could be used to determine the height of the cup and/or whether the cup is tall enough or has been raised close enough to the beverage dispenser.

Figure 1B:
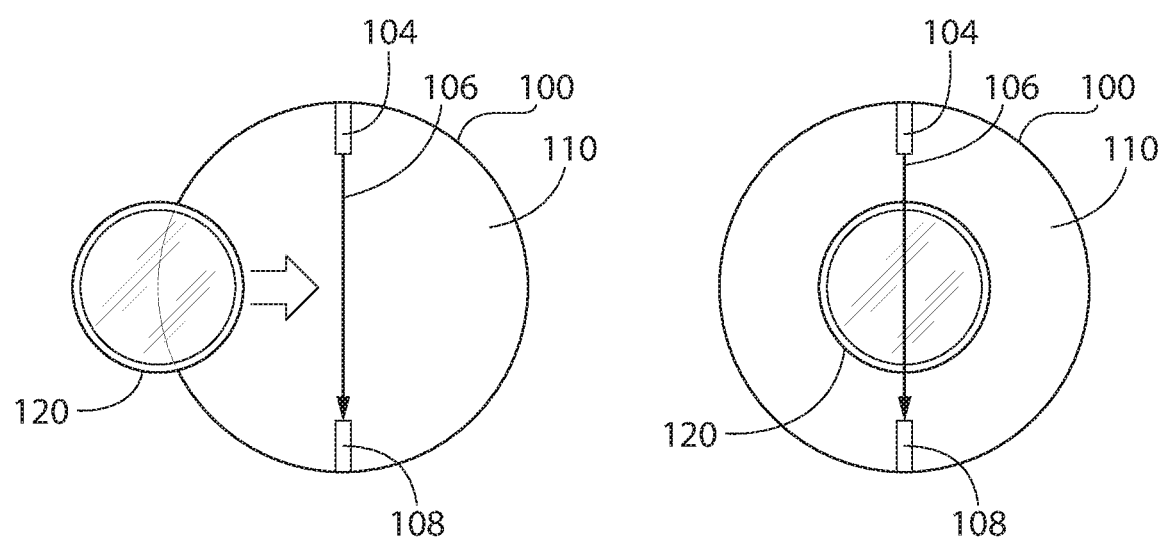
FIG. 1B is an overhead view of a transparent cup entering a cup holding region of a beverage preparation machine according to the first embodiment utilizing the break-beam approach.

FIG. 1B also shows the break-beam approach being used, but for a transparent cup 120 rather than an opaque cup. The transparent cup 120 enters the cup holding region 110 of the machine 100. Once again, before the cup 120 is inserted, the light 106 from the source 104 is transmitted to the receiver 108. But unlike the opaque cup 121, when the transparent cup is inserted, the light 106 is still capable of being transmitted to the receiver 108. Thus, the break-beam approach alone is not adequate for determining the presence, positioning, or height of a transparent cup.

Figure 2:
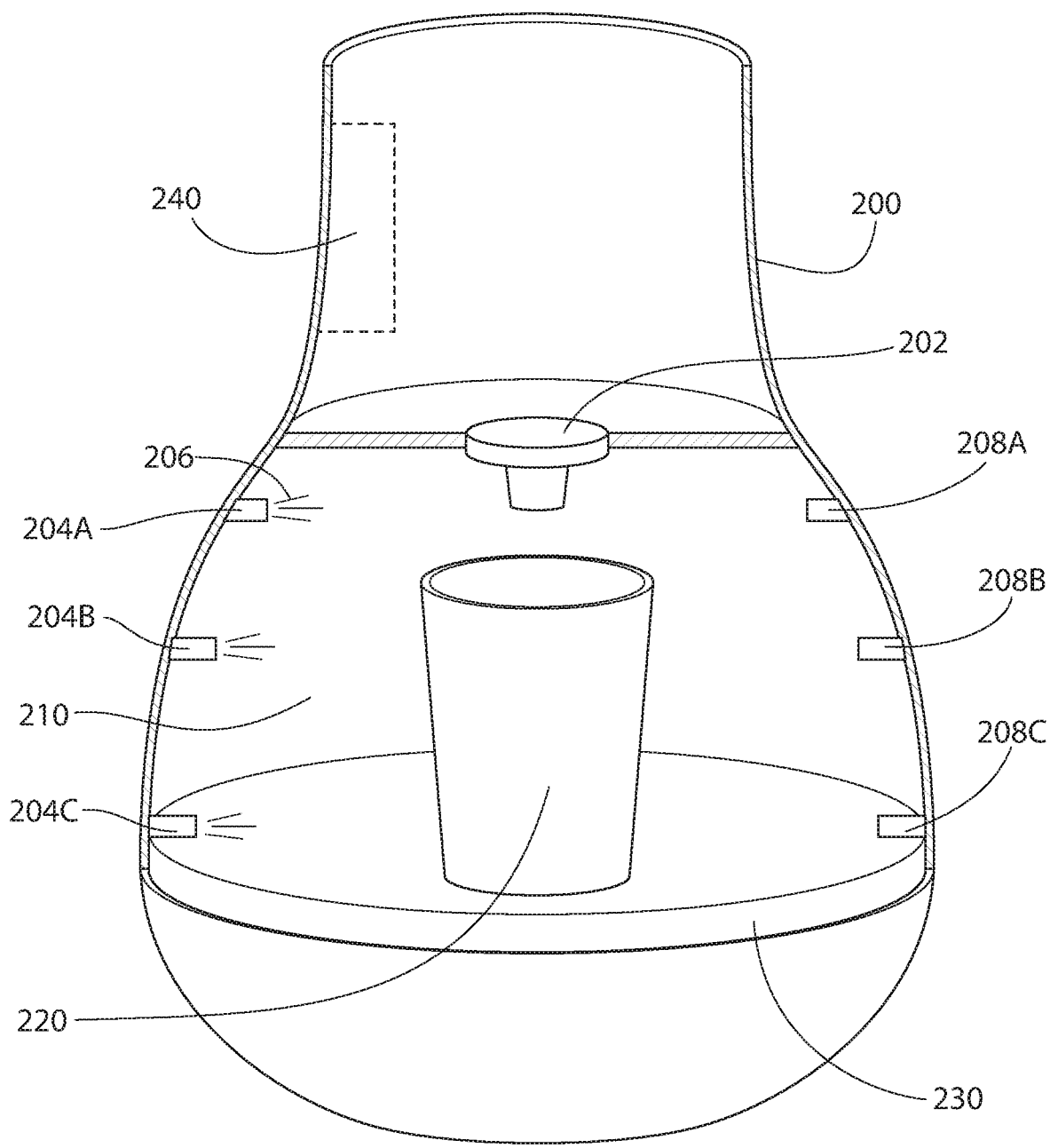
FIG. 2 is a beverage preparation machine according to an embodiment utilizing a trough-detection approach for determining that a transparent cup is properly positioned.

FIG. 2 is a beverage preparation machine 200 according to an embodiment utilizing a "trough-detection" approach for determining that a transparent cup 220 is properly positioned. As with the previous embodiment, the beverage preparation machine 200 uses high pressure to brew coffee and prepare other drinks. To ensure the drink is safely and successfully transferred to the cup 220, it is valuable to ensure that the cup is both sufficiently inserted into the cup holding region 210 and at a proper height to not be too distant from the beverage dispenser 202. In some embodiments, at the beginning of the drink preparation process, the system will prompt the user to indicate whether the cup being used is opaque or transparent, and then use a break-beam approach if opaque is indicated, and a trough-detection approach if a transparent cup is indicated. In other embodiments, the system is configured to simultaneously detect conditions for an opaque cup and a transparent cup.

As with the system utilizing only the break-beam approach, the exemplified system has at least one light source 204A, 204B, 204C transmitting light 206 to a receiver 208A, 208B, 208C, and the different light sources can be at different heights or depths to more precisely determine cup positioning and proximity to the dispenser. In the exemplified embodiment, the machine 200 further includes a cup stand 230 for lifting or dropping the cup 220 to a desired height or a desired distance from the beverage dispenser 202.

The beverage preparation machine includes a processor 240 operably coupled to the receivers 208A, 208B, 208C. The processor is not shown in detail here, though it will be understood that a variety of processing devices may be used to receive data from the light receivers 208A, 208B, 208C, determine whether positioning criteria has been met, and control the dispenser 202 accordingly. The exemplified processor is configured to both detect that a transparent cup 220 has been sufficiently inserted into the cup holding region 210, detect that the transparent cup is at a desired height and, if not, detect that the transparent cup 220 is at or has been lifted to a desired height within the cup holding region 210. In other embodiments, the machine may only detect one or two of these conditions. The method for detecting these conditions is described below. The processor can prevent the machine from dispensing the beverage when one or both of the conditions have not been met.

Figure 3:
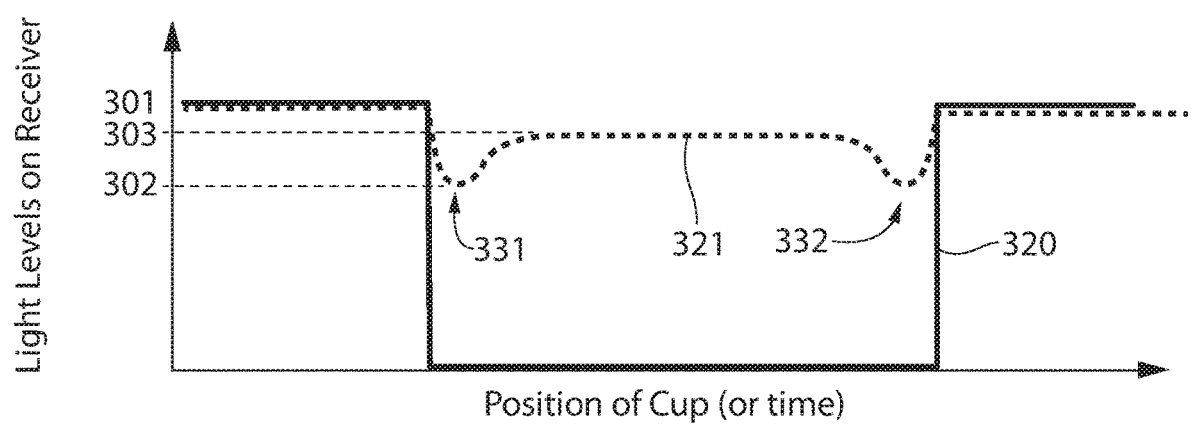
FIG. 3 is a graph of light level on a light receiver upon a transparent cup entering and leaving a cup holding region, or a light level upon a transparent cup being lifted and lowered by a cup stand according to an embodiment.

FIG. 3 is a graph of light level on a light receiver upon a transparent cup entering and leaving cup holding region, or a light level upon a transparent cup being lifted and lowered by a cup stand according to the second embodiment. Specifically, this graph shows how the system can use the break-beam approach and the trough-detection approach to detect opaque cups and transparent cups, respectively. The graph shows the light level at the receiver over time with the changing position of the cup. Waveform 320 shows the detection of an opaque cup using the break-beam approach. As can be seen, the light level received at the receiver 108 drops to zero when the opaque cup is inserted and interrupts the travel of light 206. The light is later received again at the receiver 108 when the cup is removed.

Waveform 321 shows the detection of a transparent cup using the trough-detection approach. In one embodiment, to detect a trough indicative that a transparent cup has been sufficiently inserted into the cup holding region, the system identifies the occurrence of a trough that is defined at least in part by a rate of change of the light level that is less than that of an opaque cup. As shown in FIG. 3, the light level for an opaque cup 320 drops rapidly from the first level 301 to zero since the opaque cup very effectively blocks light. By contrast, the transparent cup drops the light level gradually, and thus has a lower rate of change than that of the opaque cup. Further, when the cup is removed from the cup holding region, the opaque cup light level 320 rises rapidly from zero to the first light level 301, while the transparent cup light level 321 rises more gradually, and thus has a lower rate of change. The system can be configured to identify a rate of change of the light level changes to determine whether the rate of change corresponds with an expected rate of change (or within a range of values of a rate of change) for a transparent cup. The system can also base the determination of a trough on whether the rates of change for the decreasing light level and the increasing light level occur within a predetermined period of time.

In another embodiment for detecting that a transparent cup has been sufficiently inserted into the cup holding region, the system can detect varying light levels. In one embodiment, the system carries out the following steps: 1) detecting a first light level 301 of the light transmitted by the light source (occurring prior to insertion of the cup); 2) detecting a subsequent brief drop to a second light level 302 (caused by the edge of the cup disrupting the light beam); and 3) detecting a subsequent increase to a third light level 303 that is less than the first light level 301 (caused when the light is shining through the central area of the cup). In certain embodiments, when the cup is later removed, the system can also detect a subsequent decrease to the second light level 302 (caused when the edge of the cup disrupts the light beam upon exiting the cup holding region), and then a subsequent increase to the first light level (caused when the cup is fully removed), which is shown at second trough 332. In the exemplified embodiment, the third light level is less than the first light level, though in other embodiments the third level can be the same as or greater than the first light level (due, for example, to the lens effect). In such embodiments, it would be sufficient in step 3) to detect an increase to the third light level.

Though not required, the system can be programmed to have predetermined times for the different stages of the light level. For example, to be a brief drop of a trough of a transparent cup, the drop must be less than 0.2 seconds or some other number. Further, the system could require that the medium light level be sustained for a time greater than a first value but less than a second value. Further, this method can be adapted for use with multiple beams at different depths. For example, the system could determine which beams (at different depths) saw troughs and how many troughs to determine how deeply the cup was placed in the cup holding region.

The term "trough" as used herein refers to a light level pattern that includes a drop in light level followed by an increase in light level, the drop and increase occurring in a brief (typically predetermined) period of time. The trough characteristic of an edge of a transparent cup will have a rate of change lower than that of an edge of opaque cup, the edge of an opaque cup causing a quicker drop in light level. In certain embodiments, a single set of trough shape characteristics (such as rate of drop, time of light level changes, and/or magnitude of light level changes) are used to identify all transparent cup boundaries. In other embodiments, different sets of trough shape characteristics will be used for different types of transparent cups (e.g., thicker glass cups causing deeper or wider troughs), or different edges of transparent cups (e.g., using one set of characteristics for side edge-caused troughs and another set of characteristics for rim edge-caused troughs).

Using the above-described trough-detection approaches, the system can also determine whether the transparent cup is tall enough to be at a desired height. For example, the system can use a light beam at a desired height to detect entry of the cup at that height, and thus ensure the cup is tall enough to not be too distant from the dispenser. If the receiver at the desired height does not see a trough, then the system knows that the cup is not tall enough.

Figure 4:
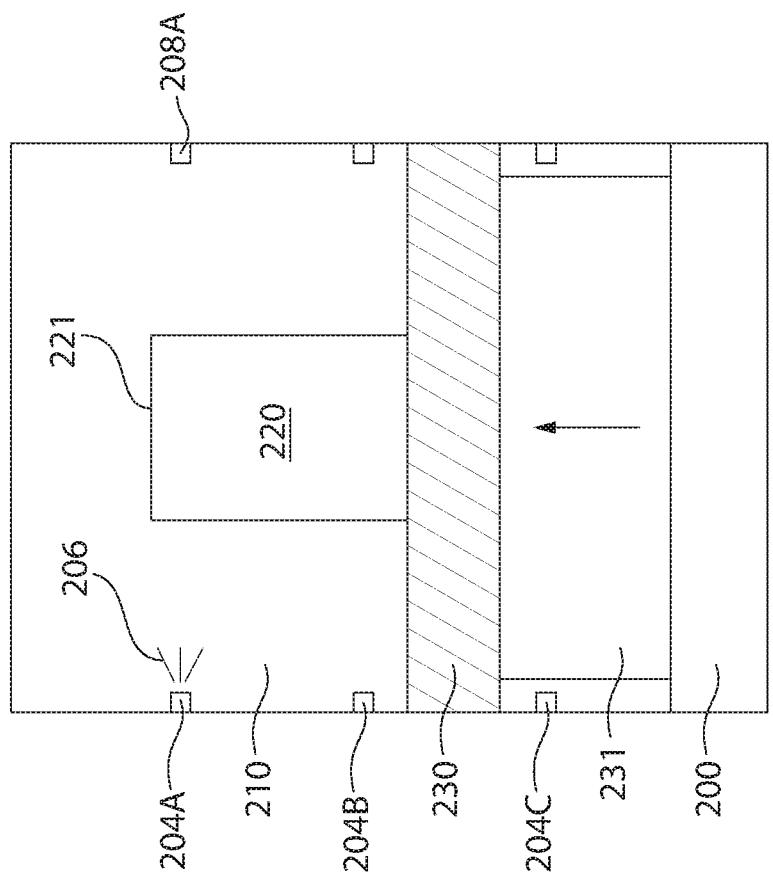
FIG. 4 is a simplified side view of a transparent cup being raised within a cup holding region of a beverage preparation machine according to one embodiment.
Figure 4:
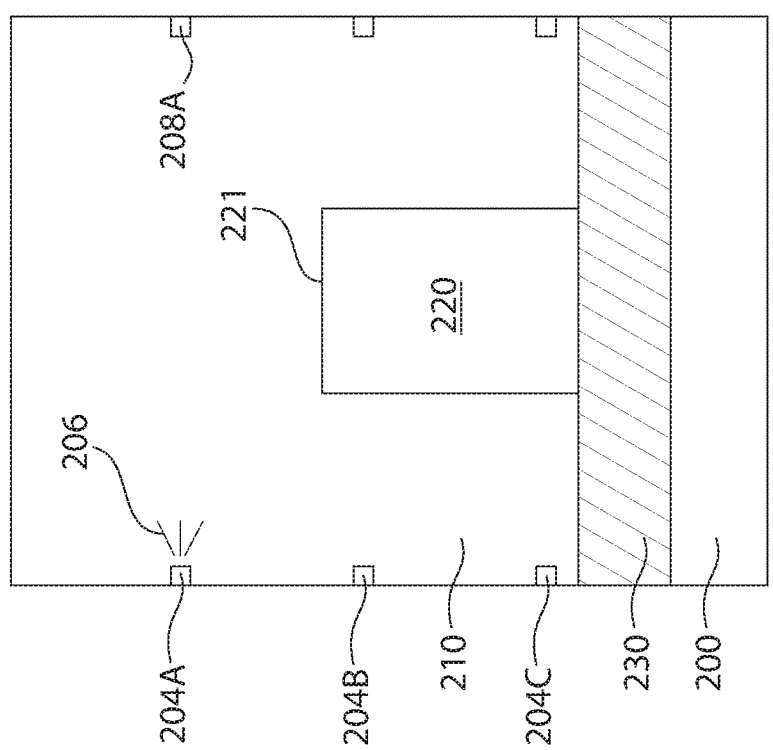

The trough-detection approaches discussed above can also be utilized for determining that a transparent cup has been lifted to a desired height within the cup holding region. FIG. 4 is a simplified side view of a transparent cup 220 being raised within the cup holding region 210 of the beverage preparation machine shown in FIG. 2. As noted earlier, with high-pressure beverage preparation, it is desirable to have the cup be only a minimal distance below the dispenser. Thus, the machine can include a cup stand 230 (as shown in FIG. 2) to lift (or lower) the cup 220 to the desired height. The break-beam approach can be used for determining that an opaque cup has reached the height of the light source and receiver, but this approach is inadequate for a transparent cup that allows light to pass through. In one embodiment, the lifting process and the detection of the increased height is carried out after it is first determined that the cup is not at the desired height. It is noted that in yet other embodiments, rather than moving the height of the cup, the height or position of the dispenser may be altered to ensure that there is a proper distance between the top of the cup and the dispenser.

The exemplified machine 200 includes three light sources 204A, 204B, 204C, each emitting a light 206. In the first diagram the cup stand 230 has the transparent cup 220 at a height such that its rim 221 is below the top light source 204A. In the second diagram, a lifting mechanism 231 has lifted the cup stand 230, thereby lifting the cup 220. To detect that the cup 220 has been raised to a desired height near the height of the light source 204A and its corresponding receiver 208A, the system can detect whether a trough such as first trough 331 of FIG. 3 has occurred. The first trough 331 will be caused by the rim 221 of the transparent cup causing a temporary, increased disruption to the light beam. The trough can be recognized by methods similar to the trough detection methods discussed above in reference whether the cup has sufficiently been inserted into the cup holding region. Thus, in one embodiment, the trough can be defined at least in part by a rate of change of the light level that is less than that of an opaque cup. The system can be configured to identify a rate of change of the light level changes to determine whether the rate of change corresponds with an expected rate of change (or within a range of values of a rate of change) for a transparent cup. The system can also base the determination of a trough on whether the rates of change for the decreasing light level and the increasing light level occur within a predetermined period of time. When the rim 221 of the cup 220 has reached the height of the top light source 204, the processor can instruct the lifting mechanism 231 to stop lifting the cup stand 230.

In another embodiment for detecting that a transparent cup has been sufficiently inserted into the cup holding region, the system can detect varying light levels. For example, the system can carry out the following steps: 1) detecting a first light level 301 of the light transmitted by the light source (occurring prior to the rim being lifted to the light beam); 2) detecting a subsequent brief drop to a second light level 302 (caused by the ridge of the transparent cup disrupting the light beam); 3) detecting a subsequent increase to a third light level 303 that is less than the first light level 301 (caused when the light is shining through the area of the cup below the ridge). In other embodiments, the third light level can be equal to or greater than the first light level, in which case step 3) can simply detect whether there was an increase to the third light level. As discussed above, the system can be programmed to have predetermined times for the different stages of the light levels. For example, to be a brief drop of a trough of a transparent cup, the drop must be less than 0.2 seconds or some other number. Further, this method can be adapted for use with multiple beams at different heights. For example, the system could determine which beams (at different heights) saw troughs to more precisely determine how high the cup has been raised.

It is noted that, if the sensor height is below the height of the dispensed drink (e.g., sensor 204B of FIG. 4), the trough shape and light level may be affected by the properties of the drink. For example, a dark coffee would decrease the received light level. The opacity or transparency of a drink, however, will not impact the initial rim detection for determining the height of the cup.

While the invention is not so limited, in the exemplified embodiment of FIGS. 2 and 4, there are three light sources 204A, 204B, 204C and three corresponding receivers 208A, 208B, 208C at three different heights. The upper light source 204A and receiver 208A are generally used to detect whether the cup is at a desired height, while the lower and middle light sources 204B, 204C and receivers 208B, 208C are generally used to detect whether the cup has been sufficiently inserted into the cup holding region. Note that if the cup stand 230 has been raised, the lower light source 204C may be blocked, and thus the middle light source 204B can be used to detect the cup. In one embodiment, the stand begins raised at a predetermined height (10 mm) and then raises or drops as necessary.

While the foregoing embodiments discuss identifying a trough, it is noted that the system could be configured to identify an inverted trough. This would be relevant, for example, if the system used a light control system to maintain the light levels seen by the receiver. In one example control system, when a transparent cup blocked a portion of the light being transmitted, the transmitter would compensate for the light blockage by providing a higher light level such that the receiver was still receiving the same light level. Further, when the cup was removed, the transmitter could accordingly reduce its light level to that provided before the cup was inserted, thus ensuring the receiver receives a consistent light level. In this case, if the system was tracking the varying light levels provided by the transmitter (instead of the light levels received by the receiver, the waveforms in FIG. 3 would be the opposite of that shown. That is, the light level would begin at the first light level, rise briefly, then fall. Thus, the light level would change in the opposite fashion of trough 331. Thus, rather than tracking the light level at the receiver, the system could alternatively track the light level at the transmitter, simply looking for a pattern opposite to that of the trough. The different aspects of the trough discussed above that can be detected (e.g., rate of change, light level, and time between events), can also apply to detecting an inverted trough. As used herein, the term "trough-detection approach" refers to detecting a trough or an inverted trough.

Figure 5:
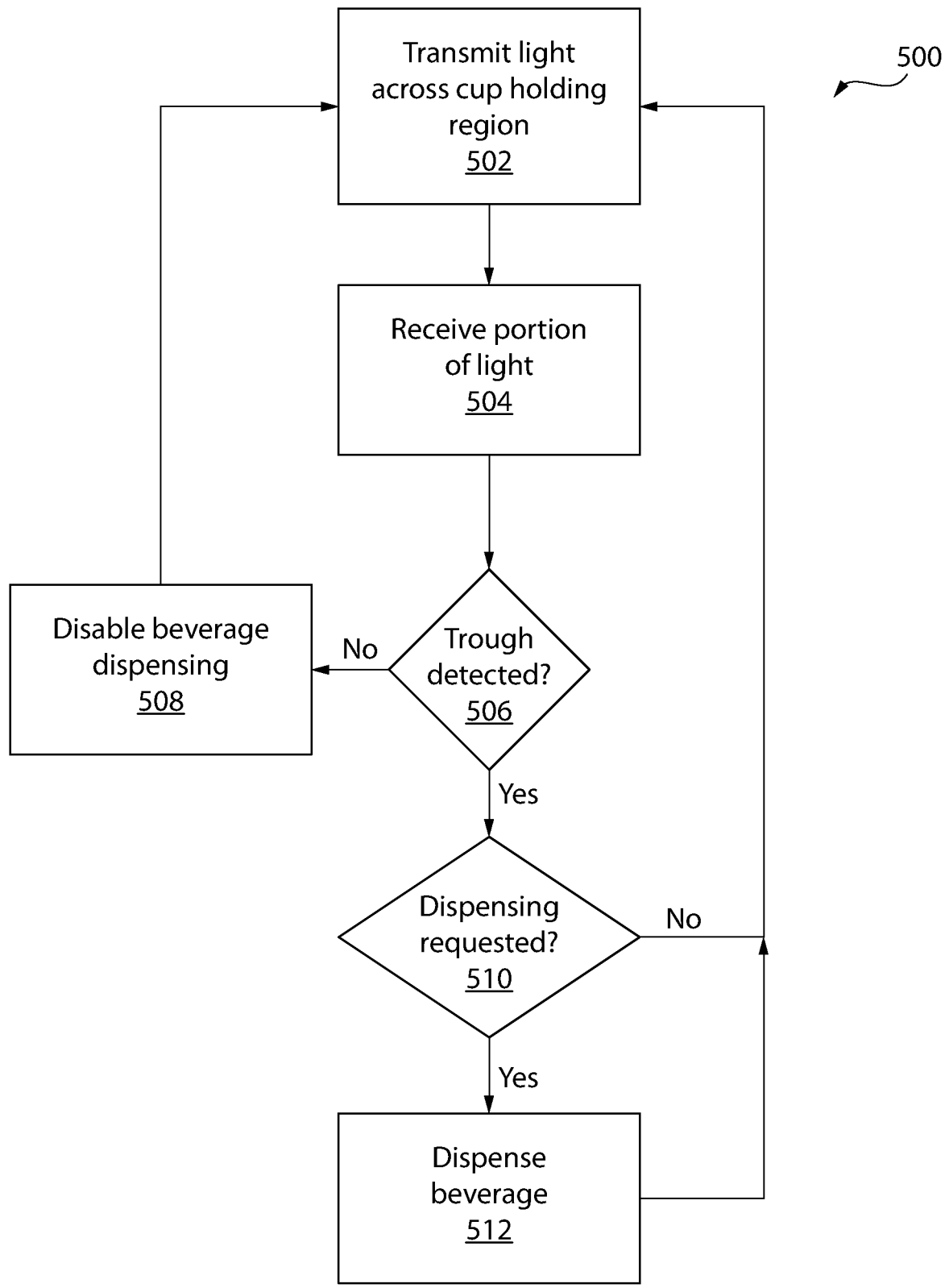
FIG. 5 is a flowchart for a method for preparing a beverage according to one embodiment.

FIG. 5 is a flowchart for a method 500 for preparing a beverage according to one embodiment. As discussed above, a light source may transmit a light across a cup holding region (operation 502), and a receiver may receive a portion of the light (operation 504). The trough-detection method may then be used to detect a trough (operation 506). If a trough is not detected, the processor may prevent the beverage dispenser from dispensing a beverage (operation 508). If a trough is detected, the method may receive a request to dispense a beverage (operation 510) and dispense the requested beverage (operation 512). When the trough is not detected, the method may also provide some type of notice to the user, such as a message on a screen, to inform the user that the cup is not properly positioned.

The disclosed embodiments provide a reliable, cost-effective solution for detecting the presence and proper positioning of transparent cups in a beverage preparation machine. These embodiments will help ensure that drinks are more safely and effectively dispensed into the cups of users.

It is noted that, while the invention has been discussed above with reference to a beverage dispenser and a transparent cup, the invention is not so limited. The invention may be used in other processes that require detecting a position of a transparent object. For example, in the realm of manufacturing using robots, there may be a need to ensure proper positioning of an object before performing a process on the object. If the object has a transparent portion, the trough-detection approach described above may be used. Thus, the invention may be described more broadly as an apparatus may having a holding region for holding an object having a transparent portion, a light source for transmitting light across a portion of the holding region, and a receiver for receiving at least a portion of the transmitted light. The processor of the apparatus can carry out the trough detection approach described above (detecting a trough or an inverted trough) to determine whether the object has been sufficiently inserted into the holding region or is at a desired height. Further, the apparatus may, upon making the determination that the object is not sufficiently inserted or at the desired height, prevent a process from being carried out, such as a process to be performed on or with the object. The various methods for detecting a trough or inverted trough (and associated functionalities) described above may also be used for this apparatus.

While the inventions have been described with respect to specific examples including presently preferred modes of carrying out the inventions, those skilled in the art will appreciate that there are numerous variations and permutations of the above described systems and techniques. It is to be understood that other embodiments may be utilized and structural and functional modifications may be made without departing from the scope of the present inventions. Thus, the spirit and scope of the inventions should be construed broadly as set forth in the appended claims.

What is claimed is:

1. A beverage preparation machine comprising:
  a beverage dispenser;
  a cup holding region located below the beverage dispenser;
  a cup stand;
  a first light source and a second light source, each of the first and second light sources configured to transmit light across a portion of the cup holding region, the second light source being located closer to the beverage dispenser than the first light source;
  a first light receiver configured to receive the light transmitted by the first light source and a second light receiver configured to receive the light transmitted by the second light source; and
  a processor operably coupled to the first and second light receivers and to the beverage dispenser, the processor configured to receive data from the first and second light receivers to: (1) determine whether a cup has been sufficiently inserted into the cup holding region on the cup stand; (2) determine whether the cup is a transparent cup or an opaque cup; and (3) determine whether the cup is at a desired height;
  wherein the processor determines that the cup is an opaque cup when the light transmitted by at least one of the first and second light sources is not received by a corresponding one of the first and second light receivers;
  wherein the processor determines that the cup is a transparent cup when a light level of the light received by at least one of the first and second light receivers comprises a trough;
  wherein the processor determines that the cup is at a desired height when at least one of: (1) the light transmitted by the second light source is not received by the second light receiver; and (2) the light level of the light received by the second light receiver comprises the trough; and
  wherein the processor is configured to, upon making the determination that the cup is not sufficiently inserted or at the desired height, prevent the beverage dispenser from dispensing a beverage and detect whether the cup has subsequently been lifted to the desired height.

2. The beverage preparation machine of claim 1 wherein the trough has a shape defined in part by a rate of change of the light level that is less than that caused by an opaque cup.

3. The beverage preparation machine according to claim 1 further comprising:
  wherein the trough comprises:
    the light level of the light received by the at least one of the first and second light receivers is a first light level for a first time period;
    the light level of the light received by the at least one of the first and second light receivers is a second light level for a second time period that is subsequent to the first time period, the second light level being less than the first light level; and
    the light level of the light received by the at least one of the first and second light receivers is a third light level for a third time period that is subsequent to the second time period, the third light level being greater than the second light level.

4. The beverage preparation machine according to claim 3 wherein the first light level is greater than the third light level.

5. The beverage preparation machine according to claim 1 further comprising:
  wherein the processor is configured to prompt a user to indicate whether the cup is the transparent cup or the opaque cup.

6. A method comprising:
  transmitting, by a first light source, a first light across a cup holding region of a beverage preparation machine, the beverage preparation machine comprising a beverage dispenser and a processor;
  transmitting, by a second light source, a second light across the cup holding region of the beverage preparation machine;
  receiving, by a first light receiver, at least a portion of the first light transmitted by the first light source;
  receiving, by a second light receiver, at least a portion of the second light transmitted by the second light source;
  wherein the second light source and the second light receiver are located closer to the beverage dispenser than the first light source and the first light receiver;
  monitoring, with the processor, a first light level of the first light received by the first light receiver and a second light level of the second light received by the second light receiver;
  inserting a cup into the cup holding region;
  after inserting the cup into the cup holding region, determining, with the processor, that the cup is an opaque cup when at least one of the first light is not received by the first light receiver and the second light is not received by the second light receiver;

after inserting the cup into the cup holding region, determining, with the processor, that the cup is a transparent cup when at least one of: (1) the first light level received by the first light receiver defines a first trough; and (2) the second light level received by the second light receiver defines a second trough;

wherein when the second light is not received by the second light receiver, determining, with the processor, that the opaque cup is at a desired height, the processor subsequently initiating the beverage preparation machine to dispense a requested beverage from the beverage dispenser into the opaque cup;

wherein when the second light is received by the second light receiver with the second light level defining the second trough, determining, with the processor, that the transparent cup is at the desired height, the processor subsequently initiating the beverage preparation machine to dispense the requested beverage from the dispenser into the transparent cup;

upon the processor determining that the transparent cup or the opaque cup is not sufficiently inserted or at the desired height, the processor preventing the beverage dispenser from dispensing the requested beverage and detecting monitoring whether the transparent cup or the opaque cup has subsequently been inserted into the cup holding region and lifted to the desired height.

7. The method according to claim 6 further comprising: wherein the first trough comprises: the first light level received by the first light receiver being a first level for a first time period, dropping to a second level for a second time period, and increasing to a third level for a third time period, the first and third levels being greater than the second level.

8. The method according to claim 7 wherein the first level is greater than the third level.

9. The method according to claim 6 further comprising:
prior to the insertion of the cup into the cup holding region, prompting a user to indicate whether the cup to be inserted into the cup holding region is the transparent cup or the opaque cup.

10. A beverage preparation machine comprising:
a beverage dispenser;
a cup holding region located below the beverage dispenser;
a cup stand;
a first light source and a second light source, each of the first and second light sources configured to transmit light across a portion of the cup holding region, the second light source being located closer to the beverage dispenser than the first light source;
a first light receiver configured to receive the light transmitted by the first light source and a second light receiver configured to receive the light transmitted by the second light source; and
a processor operably coupled to the first and second light sources and to the beverage dispenser, the processor configured to receive data from the first and second light sources to: (1) determine whether a cup has been sufficiently inserted into the cup holding region on the cup stand; (2) determine whether the cup is a transparent cup or an opaque cup; and (3) determine whether the cup is at a desired height;

wherein the processor determines that the cup is an opaque cup when the light transmitted by at least one of the first and second light sources is not received by a corresponding one of the first and second light receivers;

wherein the processor determines that the cup is a transparent cup when a light level of the light transmitted by at least one of the first and second light sources has an inverted trough;

wherein the processor determines that the cup is at a desired height when at least one of: (1) the light transmitted by the second light source is not received by the second light receiver; and (2) the light level of the light transmitted by the second light transmitter has the inverted trough; and wherein the processor is configured to, upon making the determination that the cup is not sufficiently inserted or at the desired height, prevent the beverage dispenser from dispensing a beverage and detect whether the cup has subsequently been lifted to the desired height.

11. The beverage preparation machine according to claim 10 wherein the inverted trough is generated by the at least one of the first and second light sources providing a higher light level when a transparent cup blocks a portion of the light being transmitted by the at least one of the first and second light sources.

12. The beverage preparation machine according to claim 10 wherein the inverted trough comprises the light level transmitted by the at least one of the first and second light sources beginning at a first light level, rising briefly, and then falling.

13. The beverage preparation machine according to claim 10 further comprising:
wherein the first and second light sources are configured to increase the light level of the light transmitted therefrom when the light is blocked by a transparent cup so that a received light level received by the first and second light receivers remains consistent.

* * * * *